US 6,684,067 B2

(12) United States Patent
Blanke et al.

(10) Patent No.: US 6,684,067 B2
(45) Date of Patent: Jan. 27, 2004

(54) METHOD OF INITIALIZING A LINK BETWEEN A MOBILE TERMINAL AND A DOMESTIC BASE STATION

(75) Inventors: Gero Blanke, Murr (DE); Francis Pinault, Bois-Colombes (FR); Samira Messiet, Versailles (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/158,146

(22) Filed: Sep. 22, 1998

(65) Prior Publication Data

US 2001/0046850 A1 Nov. 29, 2001

(30) Foreign Application Priority Data

Sep. 23, 1997 (FR) ............................................. 97 11834
Mar. 25, 1998 (FR) ............................................. 98 03701

(51) Int. Cl.$^7$ ................................................ H04M 1/66
(52) U.S. Cl. ..................... 455/411; 455/426.1; 455/462; 455/465; 455/558
(58) Field of Search ................................. 455/410, 411, 455/426.1, 445, 462, 465, 558, 456.1, 456.3, 456.5, 555

(56) References Cited

U.S. PATENT DOCUMENTS

| 5,535,259 A | * | 7/1996 | Dent et al. .................. 455/33.1 |
| 5,598,459 A | * | 1/1997 | Haartsen ...................... 455/411 |
| 5,839,075 A | * | 11/1998 | Haartsen et al. ............. 455/450 |
| 6,052,591 A | * | 4/2000 | Bhatia ......................... 455/445 |
| 6,141,547 A | * | 10/2000 | Rousseau et al. ........... 455/426 |

FOREIGN PATENT DOCUMENTS

| WO | WO 95/02927 | * | 1/1995 |

* cited by examiner

Primary Examiner—Quochien Vuong
(74) Attorney, Agent, or Firm—Sughrue Mion, PLLC

(57) ABSTRACT

A method of initializing a link between a mobile terminal of a public mobile network and a domestic base station, for example a public switched network base station, comprises authentication of the mobile terminal by the public mobile network, transmission of data for initializing the link with the domestic base station to the terminal from the public mobile network and transmission of the data from the mobile terminal to the domestic base station. The public mobile network operator can therefore manage the channels used by the mobile terminal for the link with the domestic base station. The method further assures authentication that is as secure as that of the public mobile network.

28 Claims, No Drawings

METHOD OF INITIALIZING A LINK BETWEEN A MOBILE TERMINAL AND A DOMESTIC BASE STATION

BACKGROUND OF THE INVENTION

1. Field of the Invention

The present invention concerns a method of initializing a link between a mobile terminal of a public mobile network and a domestic base station, for example a base station of a public switched network.

The invention also concerns an initialization service for a link of the above kind.

2. Description of the Prior Art

The invention concerns cordless telephones. Cordless telephony systems (CTS) are currently available in the form of handsets or terminals and base stations having a radio link of limited range, for example limited to domestic use within an apartment or a house. In the future such telephone systems may operate in frequency bands already covered and used by public mobile network operators. This gives rise to a problem of frequency management.

Another problem is the management of security parameters of the links between the handsets and the base stations.

Yet another problem is that of the multiplicity of portable handsets; a user can have one portable handset for a public mobile network and another handset for a cordless telephone. GB-A-2 282 735 mentions that it has been suggested that the same portable handset could be used for the public mobile network and for the public switched network. The above document explains that this solution is not advantageous because of the resulting complications in frequency management needed to prevent interference between separate domestic base stations or devices need to prevent such interference, for example by dynamic allocation of channels.

The use of a single portable handset for the public mobile network and for a domestic base station is envisaged in the GSM CTS system currently undergoing standardization, for example. One feature of this system is the subset or subsets of frequencies used for communication between a domestic base station and the single mobile terminal for the public mobile network used to communicate with a domestic base station.

The use of a dynamic scheme of channel allocation, as suggested in GB-A-2 282 735, requires the domestic base station and the mobile terminal to be initialized with the same parameters, for example to have the same starting frequency and to use the same frequency changing algorithm. A first solution to this problem is to initialize the portable handsets and the domestic base stations with the same parameters; this rules out individual allocation of channels and dynamic allocation of channels; this further rules out selling the domestic base stations and the handsets separately.

GB-A-2 282 735 proposes a device for automatically routing calls to a portable handset of a public mobile network or to the conventional switched telephone network according to the distance between the portable handset and a domestic base station; the above document proposes automatic routing of calls to the switched telephone network when the handset is near the base station; the proximity of the handset is detected by low-power narrow-band telemetry signals transmitted by the handset. This solution does not solve the problem of the multiplicity of handsets or the problem of frequency management raised by the extension of public mobile network frequencies.

The invention therefore proposes a solution to the problem of managing parameters of cordless telephone systems enabling the use of the same portable handset for a link to a public mobile network and for a link to a domestic base station. It also enables a network operator to control the parameters of the links with the domestic base stations.

It also solves the new problem of initializing domestic base stations in mobile telephone systems using a single portable handset.

It further solves the new problem of variation in time of the position of the domestic base station and enables tracking of link parameters allocated to domestic base stations.

The invention has the advantage of enabling management of the parameters of links with domestic base stations by the administrator of a public mobile network. It enables the mobile terminals and the base stations to be sold separately. It assures authentication of the mobile terminal and the base station with a high level of security.

SUMMARY OF THE INVENTION

To be more precise, the invention proposes a method of initializing a link between a mobile terminal of a public mobile network and a domestic base station, comprising:

authentication of the mobile terminal by the public mobile network, transmission of data for initializing the link with the domestic base station to the terminal from the public mobile network, and transmission of said data from the mobile terminal to the domestic base station.

In one embodiment the method further comprises a step of the mobile terminal calling a special service number before the authentication step.

The link initialization data advantageously depends on the location of the mobile terminal during the authentication step.

In another embodiment, the initialization data includes time information.

The authentication step can include the normal authentication of the mobile terminal by the public mobile network. It can also include transmission by the mobile terminal of information required for initializing the link, such as the type of domestic base station.

In one embodiment, the step of transmitting data from the mobile terminal includes the storage of the initialization data in a smart card of the mobile terminal and insertion of said smart card into a card reader of the domestic base station.

In another embodiment, the step of transmitting data from the mobile terminal includes the transmission of data from the mobile terminal to the base station over a link separate from the link to be set up. The separate link can be a contactless link such as an infrared link or a microwave link for contactless cards.

The method can include a step of authorizing data transfer before the step of transmitting data from the mobile terminal.

The domestic base station is a public switched network terminal, for example, or a private automatic branch exchange terminal.

The invention also proposes a service for management of links between mobile terminals of a public mobile network and domestic base stations, comprising:

authentication of a mobile terminal by the public mobile network, and transmission of data for initializing the link with a domestic base station to the terminal from the public mobile network.

In one embodiment, the service further includes a step of receiving a call from a mobile terminal before the authentication step.

The link initialization data advantageously depends on the location of the mobile terminal during the authentication step.

The initialization data preferably includes time information.

In one embodiment, the authentication step includes the normal authentication of the mobile terminal by the public mobile network. It can also include transmission by the mobile terminal of information required for initialization of the link, such as the type of domestic base station.

The invention further proposes a domestic base station comprising a smart card reader.

Finally, it concerns a cordless telephone system comprising a domestic base station, a mobile terminal and a link between the base station and the terminal separate from the telephone link.

The separate link is preferably a contactless link such as an infrared link or a microwave link for contactless cards.

Other features and advantages of the invention will become apparent from a reading of the following description of embodiments of the invention given by way of example only and with reference to the GSM CTS.

DETAILED DESCRIPTION OF THE PREFERRED EMBODIMENTS

In this case the aim is to establish a link between a mobile terminal of a public mobile network, i.e. the GSM network, and a base station connected to a switched public network, for example. As explained above, a link of this kind enables the same handset to be used on the public mobile network and on the public switched network when it is near the domestic base station.

The invention proposes that the data for initializing the link, including the frequencies or channels to be used to set up the link, the starting frequency, the frequency variation law or the maximal power allowed, or more generally the other parameters useful to the link, are transmitted to the mobile terminal from the public mobile network; the data is transmitted by the public mobile network operator, for example, which means that the operator is able to manage the frequencies used locally by the mobile terminals; the data can also be transmitted from the mobile network by an agency other than the operator.

Transmission of the data from the public mobile network enables authentication of the mobile terminal, for example using the network authentication procedures of the GSM network.

One embodiment of the invention in a GSM CTS will now be described. A mobile terminal requiring to set up a link with a domestic base station connects to the corresponding service, for example by calling a fixed or given service number. Authorization to set up the link can be given in various ways: for example, the mobile terminal in question can be registered by the operator or the service as a user authorized to set up a link of this kind; it is also possible to supply a mobile terminal with a special smart card exclusively authorizing a call to the service in question or to provide authorization to set up a link on the user's smart card; the service supplying the initialization data can also have a special number that is accessible only using a special smart card; a password can also be used, or any other appropriate procedure.

When the connection to the service has been set up the terminal is identified using the authentication procedures of the public mobile network, with all the security associated with those procedures. This avoids the problems of prior art initialization procedures concerning lack of security.

The information needed to determine the initialization data for the link can be stored on the smart card of the terminal to be transmitted to the service; it can also be supplied by the user using the terminal or by the service operator; it is also possible to obtain this data directly from the user when the latter requests authorization to set up a link subsequently. Information on the position of the mobile terminal when it requests the setting up of a link is typically provided by the public mobile network according to the cell of the network in which the terminal is located; the type of domestic base station with which the link must be set up can be supplied by the user in the form of a code when making the connection to the service, for example.

The data needed to initialize the link can then be sent to the terminal from the public mobile network, if necessary with a time stamp or seal, as explained below; the data is stored on the user's smart card. The data transmitted to the mobile terminal is then transmitted from the mobile terminal to the base station to enable the link to be set up afterwards; following this step, the mobile terminal and the domestic base station both have the initialization data. The transmission step can be effected in various ways; ideally the transmission step is at least as secure as the mobile terminal authentication step.

In the GSM network, the link initialization data can advantageously be stored on the smart card (SIM card) of the mobile terminal or on a special card dedicated to setting up the link with the domestic base station; the data can then be transmitted to the domestic base station simply by inserting the corresponding SIM card into a card reader of the domestic base station. This merely requires the provision of a smart card reader in the domestic base station.

In either case it is not necessary for the domestic base station to be in an area covered by the public mobile network.

The initialization data can be stored in the SIM card of the mobile terminal and transferred to the base station via the SIM card by providing a card reader in the base station, as explained above. Other modes of transferring link initialization data between the mobile terminal and the domestic base station can also be provided. A separate, contactless link can be provided between the mobile terminal and the domestic base station, for example. Examples of such links are infrared links or microwave links for contactless card readers.

In this case the invention operates in the following manner, for example. The base station detects the presence of a mobile terminal; in the case of an infrared link, this detection can be assured if the user approaches the terminal of the base station with the infrared transceiver of the terminal facing that of the base station. In the case of a microwave link the base station can detect the presence of a smart card in its vicinity.

After detecting the presence of a mobile terminal the base station sends an initialization data request to the mobile terminal on a separate link. This request is received by the mobile terminal. In this case the mobile terminal can be adapted to transmit the necessary information to the base station only when authorized by the user; for example, transfer of data to the base station can be authorized only upon entry of a confidential code on the mobile terminal or subject to any other means of authenticating the user on the mobile terminal. If the authorization is given, or if authorization is not required, the initialization data is transmitted to the base station by the mobile terminal over the separate link. The link between the base station and the mobile terminal can then be set up.

An embodiment of the above kind avoids any additional action by the user, other than an authentication request, where applicable; the service is then available without the user having to insert their card into the domestic base station. It also avoids problems that could arise if the user forgets to remove the card from the base station.

Furthermore, it is clear that the above embodiment can be designed independently of the source of the data needed for initializing the link between the mobile terminal and the base station. Data can be transferred from the mobile terminal to the base station using an SIM card or a separate link each time the mobile terminal enters the coverage area of the domestic base station; the initialization data is not necessarily updated from the public network each time the terminal enters the coverage area. The data could also be stored in the card of the mobile terminal and not updated from the public mobile network.

When the data is transmitted from the public mobile network to enable use of the initialization data in a limited geographical area, the initialization data can be transmitted with a time stamp or seal; it is then possible for the domestic base station to know when the mobile terminal received the initialization data. Setting up the link can then be permitted only if the initialization data was transmitted to the domestic base station within a given time period following its reception, or only if the link is setup for the first time in a given time period following reception of the data. This assures limitation of the movement of the mobile terminal between the time it receives the data and the time the data is transmitted to the domestic base station. In this way use of the link initialization data and, for example, the channels allocated to the link is limited to a geographical area under the control of the network operator.

If the base station is moved its electrical power supply is disconnected and this can be used to indicate movement of the base station necessitating a new link initialization procedure at the new location of the base station, possibly with new parameters; in this way the invention allows dynamic management of initialization data of different links employed by the mobile terminals of the mobile public network.

Clearly the invention allows the mobile terminals and the domestic base stations to be sold separately, and allows future evolution of the terminals and the stations; it also allows the initialization of a plurality of links with different base stations at different places. It also allows a base station to be initialized and to set up links with different mobile terminals.

From the point of view of the network operator, or that of the authority managing the allocation of parameters for links between the mobile stations and the domestic base stations, the invention can provide a link management service. This service comprises a step of transmitting link initialization data to the mobile terminal from the public mobile network after a step of authentication of a mobile terminal by the public mobile network. As explained above, the authentication step can be effected using only the existing authentication capabilities of the network, such as those of the GSM network. This can be done after a call from the mobile terminal to a given number on the public mobile network.

The procedure for setting up the link once the mobile terminal and the base station have the initialization data is well known to the skilled person and can be implemented easily; likewise recognition by the domestic base station of the proximity of the terminal; in this regard reference may be had to the methods mentioned in document GB-A-2 282 735.

Of course, the present invention is not limited to the examples and embodiments described and shown, but is open to many variants that will be evident to the skilled person. For example types of networks other than the GSM network or the public switched network could be used.

There is claimed:

1. A method of initializing a link between a mobile terminal of a public mobile network and a domestic base station, comprising:

authentication of said mobile terminal by said public network;

separate from said authentication, transmission, by said public mobile network to said mobile terminal, of an authorization to initialize said link between said mobile terminal and said domestic base station, and of data specific for initializing said link; and transmission of said data from said mobile terminal to said domestic base station;

wherein said data specific for initializing includes time stamp information and initializing said link between said mobile terminal and said base station fails if the data specific for initializing is received beyond a given time period.

2. A method as claimed in claim 1 further comprising a step of said mobile terminal calling a special service number before said authentication step.

3. The method claimed in claim 1 wherein said link initialization data depends on the location of said mobile terminal during said authentication step.

4. The method claimed in claim 1 wherein said authentication step includes the normal authentication of said mobile terminal by said public mobile network.

5. The method of claim 1 wherein said step of authentication of said mobile terminal includes transmission by said mobile terminal of information required for initializing said link.

6. The method as claimed in claim 5, wherein said information required for initializing said link comprises the type of the domestic base station.

7. The method claimed in claim 1 wherein said step of transmitting data from said mobile terminal includes the storage of said initialization data in a smart card of said mobile terminal and insertion of said smart card into a card reader of said domestic base station.

8. The method claimed in claim 1 wherein said step of transmitting data from said mobile terminal includes the transmission of data from said mobile terminal to said base station over a link separate from the link to be set up.

9. The method claimed in claim 8 wherein said separate link is a contactless link.

10. The method as claimed in claim 9, wherein said contactless link comprises at least one of an infrared link and a microwave link for contactless cards.

11. The method claimed in claim 1 wherein said domestic base station is a public switched network terminal.

12. The method of claim 1 wherein said domestic base station is a private automatic branch exchange terminal.

13. A service for managing a link between a mobile terminal of a public mobile network and a domestic base station, comprising:

authentication of said mobile terminal by said public network; and separate from said authentication, transmission, by said public mobile network to said mobile terminal, of an authorization to initialize said link between said mobile terminal and said domestic base station, and of data specific for initializing said link;

wherein said data specific for initializing includes time stamp information and initializing said link between said mobile terminal and said base station fails if the data specific for initializing is received beyond a given time period.

14. A service as claimed in claim 13 further including reception of a call from a mobile terminal before said authentication.

15. The service claimed in claim 13 wherein said link initialization data depends on the location of said mobile terminal during said authentication.

16. The service claimed in claim 13 wherein said authentication includes the normal authentication of said mobile terminal by said public mobile network.

17. The service claimed in claim 13 wherein said authentication of said mobile terminal includes transmission by said mobile terminal of information required for initialization of said link.

18. The service as claimed in claim 17, wherein said information required for said initialization of said link comprises the type of the domestic base station.

19. A method of transferring a cellular terminal of a cellular network to a domestic base station, comprising:

authenticating the cellular terminal by the cellular network;

transmitting, from the cellular network to the cellular terminal, an authorization to initialize a link between the cellular terminal and the domestic base station, and of management parameters specific for initializing said link; and transferring the management parameters from the cellular terminal to the domestic base station;

wherein said management parameters specific for initializing includes time stamp information and transferring said cellular terminal to said base station fails if the management parameters specific for initializing are received beyond a given time period.

20. The method of claim 19, wherein, in the transmitting step, the management parameters are transmitted from the cellular network to the cellular terminal by an entity other than an operator of the cellular network.

21. The method of claim 19, wherein, after the transmitting step, the management parameters are stored on a smart card of the cellular terminal, and wherein, in the transferring step, the smart card is inserted into a smart card reader of the domestic base station.

22. The method of claim 19, wherein, in the transferring step, the management parameters are transferred from the cellular terminal to the domestic base station on a frequency different from the frequency of the link.

23. The method of claim 19, wherein the management parameters related to the link between the cellular terminal and the domestic base station are selected from the group consisting of frequencies, channels frequency variation law information, and maximal power information.

24. The method of claim 19, wherein, in the transmitting step, the management parameters transmitted from the cellular network to the cellular terminal depend on a location of the cellular terminal during the authentication step.

25. A service for managing a link between a cellular terminal of a cellular network and a domestic base station, comprising:

authenticating the cellular terminal by the cellular network; and transmitting, from the cellular network to the cellular terminal, an authorization to initialize the link between the cellular terminal and the domestic base station, and of management parameters specific for initializing the link between the cellular terminal and the domestic base station;

wherein said management parameters specific for initializing includes time stamp information and transferring said cellular terminal to said base station fails if the management parameters specific for initializing are received beyond a given time period.

26. The service of claim 25, further comprising receiving a call from the cellular terminal before the authenticating step.

27. The service of claim 25, wherein, in the transmitting step, the management parameters transmitted from the cellular network to the cellular terminal depend on a location of the cellular terminal during the authentication step.

28. The service of claim 25, wherein, in the authenticating step, the cellular terminal transmits information regarding a type of the domestic base station to the cellular network.

\* \* \* \* \*